United States Patent Office 3,014,970
Patented Dec. 26, 1961

3,014,970

PROCESS FOR THE PRODUCTION OF ALDEHYDES AND ALCOHOLS

Philip C. Johnson and Norman R. Cox, St. Albans, W. Va., assignors to Union Carbide Corporation, New York, N.Y., a corporation of New York No Drawing. Filed July 30, 1957, Ser. No. 675,026
10 Claims. (Cl. 260—632)

This invention relates to improvements in processes for the production of aldehydes and alcohols from olefins, carbon monoxide and hydrogen in the presence of cobalt-containing hydroformylation catalysts and, more particularly, this invention is directed to an improved process for the production of aldehydes and alcohols by the reaction of olefinic compounds containing at least one carbon to carbon double bond and containing at least five carbon atoms with carbon monoxide and hydrogen in the presence of colbalt-containing hydroformylation catalysts.

According to well-known prior art procedures, it is customary in a first stage to react an olefin, carbon monoxide and hydrogen together in the presence of a cobalt-containing catalyst to produce a crude hydroformylation product, comprising aldehyde and alcohols containing one more carbon atom than the reacting olefin, and which also contains the products of condensation, aldolization, acetalization and esterification. The product mixture, comprising aldehydes and alcohols containing dissolved metal catalyst, is then treated in a second stage to cause the removal of soluble metal compounds from the organic material in a catalyst removal zone. The catalyst-free material is then generally hydrogenated in a third stage to the corresponding alcohol or oxidized to the corresponding acid. The hydrogenation catalyst of the third stage is usually a finely-divided metallic nickel or cobalt catalyst or any other suitable well-known hydrogenation catalyst. In view of the fact that the hydrogenation catalyst can be readily poisoned by the presence of carbon monoxide and sulfur, the second stage, or the so-called catalyst removal stage, has become increasingly important to operators in the field because of the profound effect of the amount of carbonylation catalyst present in an aldehydic mixture of organic compounds to be hydrogenated. Certain prior art investigators have attempted to overcome these inherent difficulties. One of the prior art processes attempts to decobalt a crude reaction mixture containing a predominant amount of aldehydes by injecting water or steam into the crude hydroformylation product mixture at an elevated temperature. Certain beneficial effects were achieved, but the problem of obtaining in high yield a substantially cobalt-free aldehyde-containing product mixture, which could be successfully hydrogenated in yield, was not entirely solved. Other investigators proposed the use of an aqueous solution of a potential cobalt-catalyst compound in the first stage that forms, under the reaction conditions, an oil-soluble cobalt carbonyl compound and removed the dissolved cobalt-containing material in the second stage by steam distilling in the presence of acidic water, thereby decomposing the dissolved cobalt carbonyl compound. While this process conferred certain beneficial effects, it too suffers serious drawbacks in failing to eliminate serious losses to bottoms products comprising mainly the products of condensation, aldolization and acetalization of the hydroformylation product, which, inter alia, result in high product losses of alcohol during the hydrogenation stage.

One of the objects of this invention is to provide a process whereby bottoms products are substantially reduced, thereby maximizing yields of aldehydes and alcohols therefrom. While this is significant in the production of alcohols, it is especially beneficial if recovery of the aldehyde portion form the crude product is desired, because we have found that aldehydes can be obtained only in small quantities by direct distillation of hydroformylation crudes. Another object of the invention is to provide a process whereby serious problems, such as plugging and fouling of the hydrolyzer equipment, are substantially avoided. Still another object of this invention is to provide for an aldehyde-alcohol fraction of high quality resulting in an increase in catalyst life during hydrogenation. A further object of this invention is to provide a process whereby the induction period for cobalt carbonyl generation is substantially reduced. A still further object of this invention is to provide a process whereby the reaction period is substantially less than that which occurs when another method of catalyst introduction is employed. It is also an object of this invention to provide a novel process for injecting a water-soluble, oil-insoluble cobalt salt of a lower aliphatic carboxylic acid dissolved in a lower aliphatic alcohol medium to produce finely-divided cobalt salt particles suspended in the olefin feed in a hydroformylation zone. Another object of this invention is to provide a novel process for injecting into a hydroformylation zone a water-soluble, oil-insoluble, cobalt salt of a lower aliphatic-carboxylic acid, said cobalt salt being dissolved in a lower aliphatic alcohol vehicle, thereby producing in situ said cobalt salt finely dispersed in the olefin feed. A further object of this invention is to provide a novel process for injecting into a hydroformylation zone a water-soluble, oil-insoluble, cobalt salt of a lower aliphatic carboxylic acid, said cobalt salt being dissolved in a lower aliphatic alcohol medium, said lower aliphatic alcohol being soluble in the olefin feed, thereby producing a liquid-solid-gas hydroformylation mixture. A still further object of this invention is to provide a hydroformylation process wherein the reaction rate index is substantially decreased. These and other objects of the invention are readily accomplished when an olefin, preferably containing from 5 through 15 carbon atoms and containing at least one double bond per molecule, is reacted in the presence of a cobalt-containing hydroformylation catalyst to form a crude hydroformylation product comprising aldehydes and alcohols and containing the products of condensation, aldolization, acetalization and esterification and thereafter reacting said crude hydroformylation product containing dissolved cobalt carbonyl compounds with an aqueous sulfuric acid solution, whereby an aqueous layer containing soluble cobalt sulfate and an organic layer comprising aldehydes and alcohols is formed, separating said aqueous layer and said organic layer, and subjecting said organic layer to hydrolysis in the presence of water at a temperature above 150° C., and at pressures greater than the vapor pressure of water at the corresponding temperature, and separating the hydrolyzed product by distillation into an aldehyde-alcohol fraction. The aldehyde portion in said aldehyde-alcohol fraction is then either hydrogenated in the presence of a hydrogenation catalyst to form alcohol or is oxidized by air or oxygen to form an acid-alcohol mixture which is subsequently refined.

Preferably said hydrolysis is accomplished at temperatures in the range of from 200° C. to 300° C. under superatmospheric pressures in the range of from 250 to 1500 lb./sq. in. absolute.

This invention is based, in part, on the discovery that a hydrolyzed product can be readily obtained wherein the aldehyde component of the crude hydroformylation reaction mixture is substantially all converted to alcohol during the hydrogenation step. This invention is also based, in part, on the observation that the objects of this invention are accomplished by the effective removal of cobalt hydroformylation catalyst prior to the hydrogenation step and the effective removal of cobalt hydroformylation catalyst from the crude hydroformylation product containing the same is due, in part, to the manner in which the hydroformylation catalyst is employed in the reaction. It has been further discovered that when the reaction between an olefinic compound, carbon monoxide and hydrogen is carried out in the presence of an oil-insoluble cobalt salt of a lower aliphatic carboxylic acid dissolved in a lower aliphatic alcohol, such as cobalt acetate, there is produced a reaction mixture comprising aldehydes and alcohols containing dissolved cobalt catalyst which can be separated efficiently and effectively in such a manner that the amount of cobalt-containing material remaining behind in the organic layer will not poison the hydrogenation catalyst employed in the hydrogenation stage, thus permitting high conversions of aldehyde to alcohol. The olefins suitable for use as starting materials in the process of this invention can be any long and short-chained olefinic compounds, and include not only hydrocarbons, but most other organic compounds having a carbon to carbon olefinic linkage, such as, for example, unsaturated alcohols, acids, esters and the like. Straight and branch-chained olefins and diolefins, such as pentene, pentadiene, hexene, heptene, styrene, olefin polymers, including diisobutylene, triisobutylene, hexene dimers, heptene dimers, polypropylenes, such as tripropylene and tetrapropylene, and olefinic fractions from the hydrocarbon synthesis process, thermal or catalytic cracking operations and other sources of hydrocarbon fractions containing such olefins, can be employed as starting materials depending on the nature of the final product desired. The synthesis gas mixture fed to the first stage may be any desired ratio of hydrogen to carbon monoxide, preferably within the limits of 1.0 to 2.0 volumes of hydrogen per volume of carbon monoxide. The ratio of synthesis gas to olefin should be at least 1:1 or higher on a molar basis, preferably the ratio of synthesis gas to olefin is 1.5:1.0 on a molar basis. The conditions for reacting olefins with the synthesis gases can be varied in accordance with the nature of the olefin feed. It is preferred, however, to conduct said reaction at a temperature in the range of from 100° C. to 250° C. under superatmospheric pressures in the range of from about 2,000 to 10,000 pounds per square inch absolute.

The catalyst for the first stage of the process is employed in the form of an oil-insoluble compound of the catalytically active hydroformylation metal. The catalyst source, as employed herein, comprises an oil-insoluble cobalt salt of a lower aliphatic monocarboxylic acid such as cobalt acetate, formate and propionate dissolved in a lower aliphatic alcohol, methanol, ethanol and propanol. The employment of a water-soluble-oil-insoluble cobalt salt of a lower aliphatic carboxylic acid dissolved in a lower aliphatic alcohol as a form for the introduction of the catalyst source represents a cheaper and more readily obtainable form of cobalt. The crude hydroformylation mixture comprising aldehydes and alcohols after the reaction is complete, is then washed with an aqueous acidic solution, such as aqueous sulfuric acid, to convert all of the cobalt contained in said reaction mixture to a water-soluble cobalt salt, such as, for example, cobalt sulfate. The amount of aqueous sulfuric acid employed is not narrowly critical. Preferably, the crude hydroformylation product is washed with a one-quarter volume to an equal volume of a sulfuric acid solution of about 5 to 10 percent concentration to convert substantially all of the cobalt compounds contained therein into a water-soluble cobalt salt. Normally, the extraction of the reaction mixture with aqueous sulfuric acid is carried out at a temperature below the boiling point of the reaction mixture. The beneficial results obtained by the use of the decobalting feature of the process of this invention became evident when it was observed that a charge of 700 grams of freshly prepared crude hydroformylation product containing 0.18 percent by weight cobalt, and comprising decanals and decanols, were mixed for one hour at a temperature of 85° C. with 700 grams of water and 50 grams of concentrated sulfuric acid. Intimate mixing was obtained by dividing the crude product into two streams which were then fed through a partly closed valve to effect intimate mixing before being returned to a still kettle. After thorough mixing, the crude reaction mixture was filtered and the filter paper through which the organic layer passed was examined for cobalt. The organic layer and the filter paper were both free of cobalt, whereas the aqueous acid layer contained 0.18 percent by weight cobalt. In still another experiment, decobalting of a freshly prepared crude hydroformylation product comprising decanals and decanols was attempted by contacting said crude product with hot water at a temperature of 85° C. for 5 minutes. It was discovered that under these conditions, appreciable quantities of the contained cobalt are converted to insoluble forms and appear as suspended solids at the interface between the organic and aqueous layers. It was further determined that approximately one-third of the total cobalt present in the original crude hydroformylation product was present as solids even after contact with water at 85° C. for a period as long as one hour. In still another experiment, when 700 grams of this same freshly prepared crude hydroformylation product comprising decanals and decanols and 700 grams of water were contacted together for one hour at reflux temperatures, it was determined, after filtration of the mixture, that the organic layer was free of cobalt, the aqueous layer contained 0.13 percent cobalt and appreciable amounts of cobalt were retained on the filter paper. A cobalt balance indicated that one-third of the cobalt remained as water-insoluble solids. Thus, it may be observed that the aqueous sulfuric acid wash accomplishes a two-fold purpose; it removes cobalt compounds from the organic layer and converts water-insoluble cobalt compounds into water-soluble cobalt compounds suitable for recovery from the aqueous layer and recycle to the converter after subsequent treatment. The decobalted crude hydroformylation product can be subjected to a further wash with water if desired, to remove traces of acid.

The maximization of aldehydes is produced, according to the process of this invention, mainly in the third step of the process. The third step comprises contacting the crude reaction mixture comprising aldehydes and alcohol with water at a temperature in the range of from 150° C. to 300° C., and at autogenous pressures or higher for a period of time sufficient to effect hydrolysis of acetals and condensation products. Normally, the hydrolysis reaction is accomplished in times varying from a few seconds to several hours and preferably in one minute to an hour.

This third step is amenable to both batch and continuous operation. In a batch process the pressure hydrolysis is essentially complete shortly after an operative temperature has been reached. In a continuous operation the reaction is essentially complete after a contact time varying from several seconds to several hours of preferably space velocities in the range of from 0.75 $hr.^{-1}$ to 11.0 $hr.^{-1}$ depending on the temperature employed.

The amount of water necessary to achieve these highly beneficial results is not narrowly critical, and these results can be obtained by the employment of quantities at least stoichiometrically equivalent to the hydrolyzable components, such as acetals. An amount of about 5 percent by volume is usually sufficient to satisfy the stoichiometric requirements. In general, however, it is preferred to employ an amount of from 10 percent to about 50 percent by volume based on the amount of organic phase charged to the hydrolysis reaction. Exemplary of the beneficial results obtained by the employment of the hydrolysis step of this invention is illustrated by the following experiment, wherein a sample of decanals-decanols crude product was mixed with water and heated to a temperature of 250° C. in a rocker bomb at autogenous pressure for a period of two hours. Distillation of the recovered organic layer showed a 68.8 percent by weight of material boiling in the range of 45° C. to 115° C. at a pressure of 10 mm. Hg absolute of 95 percent purity which represents a yield of 65.4 percent by weight based on the crude hydroformylation product charged to the bomb. Distillation of a similar amount of crude reaction mixture comprising decanals and decanols without any hydrolysis treatment provided a 41.8 percent by weight of a decanal-decanol fraction boiling in the range of 45° C. to 115° C. at 10 mm. Hg absolute of 95 percent purity which represents a yield of 39.7 percent by weight based on the crude hydroformylation product charged to the still.

These effects and the results obtained are indeed multiple and surprising for it was discovered that a treatment of the crude hydroformylation product comprising aldehydes and alcohols with aqueous mineral acid, such as an aqueous sulfuric acid solution, was in itself not effectual to achieve the purposes and objects set forth hereinbefore. For example, a crude hydroformylation product comprising aldehydes and alcohols derived by the hydroformylation of nonenes, was refluxed for a period of one hour with one-quarter volume of 5 percent aqueous sulfuric acid, whereupon the organic layer was washed free of entrained acid with water. Distillation of this material afforded 46.4 percent by weight of decanal-decanol fraction boiling in the range of 45° C. to 115° C. at a pressure of 10 mm. Hg absolute of 95 percent purity which represents a yield of 44 percent by weight based on the amount of material charged to the still. The yield of bottoms product amounted to 39 percent. To further illustrate the conjoint, cooperative effect achieved through the employment of the combination of steps as hereinbefore described, an experiment was conducted on a crude sample of hydroformylation product comprising aldehydes and alcohols derived by the hydroformylation of nonenes, wherein said crude sample was subjected to a pressure hydrolysis in accordance with the invention, without the benefit of a prior washing with aqueous mineral acid as prescribed above. Serious and complete plugging of the hydrolyzer tube occurred even though numerous modes of operation were employed to avoid the same, which included adjusting hydrolyzer temperature, methods of feed injection, and varying the water to crude hydroformylation product ratio. Successful operation for extended periods could not be realized.

The substantial effect of the pressure hydrolysis feature of the process of this invention on the yield of hydrogenated product, as compared with a simple distillation followed by hydrogenation, is illustrated in the following manner; a sample of crude hydroformylation product comprising decanals and decanols obtained by the hydroformylation of nonenes was decobalted by refluxing for one hour with one-quarter volume of 5 percent aqueous sulfuric acid and the organic layer was washed with one-half volume of water. The sample was then divided into three parts. One part was distilled directly without further treatment and provided a 49.7 percent by weight of a $C_{10}$ aldehyde-alcohol fraction boiling in the range of 45° C. to 115° C. at a pressure of 10 mm. Hg absolute of 95 percent purity which represents a yield of 47.2 percent by weight based on the material charged to the still. The yield of bottoms products was 36.1 percent. The second part was hydrogenated at 150 pounds per square inch gauge and at a temperature of 180° C. in the presence of 3 percent by weight of Raney nickel catalyst and distilled to provide a 54.2 percent by weight yield of decanols boiling in the range of 98° C. to 108° C. at a pressure of 10 mm. Hg absolute of 100 percent purity. The yield of bottoms product was 25.3 percent. The third part was pressure-hydrolyzed in a rocker bomb at a temperature of 250° C. at autogenous pressure for a period of 30 minutes with one-third volume of water and subsequently hydrogenated and distilled, as described above, to provide a yield of 69.1 percent by weight of decanols boiling in the range of 98° C. to 108° C. at a pressure of 10 mm. Hg absolute of 100 percent purity. The yield of bottoms product was only 13.0 percent. Thus, it may be observed that the yield of alcohol can be readily increased and the amount of bottoms product reduced substantially by the employment of a pressure hydrolysis.

The conditions for the hydrogenation of the contained aldehyde in the aldehyde-alcohol fraction are not limited by these examples. Such hydrogenations may be effected either in the vapor phase or in the liquid phase and at pressures from 25 to 1200 p.s.i.g., at temperatures from 50° C. to 210° C., and in the presence of known hydrogenation catalyst at concentrations of 0.5 to 15 percent by weight based upon the total weight of the mixture to be hydrogenated. Although the process is not restricted to the following hydrogenation catalysts, suitable catalysts include: nickel, cobalt, platinum, or copper-chromic oxide either in a finely-divided state or on an inert support.

Alternatively, the aldehyde portion of the aldehyde-alcohol fraction can be oxidized to the corresponding carboxylic acids by the use of air or molecular oxygen with or without the aid of a catalyst, such as, for example, manganese, copper, chromium, or iron salts, or, if desired, the aldehydees can be oxidized by the use of other suitable oxidizing agents, such as, for example, potassium permanganate, nitric acid, copper (II) salts, ammoniacal silver nitrate, or by other methods well known in the art. A suitable process for the oxidation of the aldehydes was found by passing air through the refined aldehyde fraction at a rate of 10 cubic feet per hour per gallon of charge, maintaining the temperature of the reaction from 50° C. to 85° C. and the pressure at 60 pounds per square inch absolute. Upon subsequent distillation, the yield of decanoic acid was 73.6 percent based upon the amount of aldehyde charged to the reaction vessel.

The following examples illustrate the practice of the invention and the results and objects achieved thereby:

*Example 1*

A solution containing 6.5 weight percent cobalt acetate in methanol was injected along with the nonene feed stream into a hydroformylation reactor to give a final concentration of cobalt acetate of 0.75 weight percent in the reaction zone. Based on actual catalyst and olefin feed rates, the methanol concentration was equal to 11.5 weight percent of the olefin feed to the converter. Hydroformylation of the olefin was carried out at a pressure of 6000 p.s.i.g., a temperature of 200° C., and an inlet olefin space velocity of 1.5 $\text{hour}^{-1}$. The crude hydroformylation product was decobalted by refluxing for one hour with one-quarter volume of a 5 percent by weight of aqueous sulfuric acid solution and the organic layer washed with one-half volume of water. The decobalted crude product was then mixed with a one-third volume of water and heated in a rocker bomb to a temperature of 250° C. at autogenous pressure for a period of one-half hour. After the reaction was complete, the crude product was discharged from the bomb and the aqueous and organic layers separated. Upon subsequent distillation of the organic layer recovered, there was provided 68.8 percent by weight of a $C_{10}$ aldehyde-alcohol fraction boiling over a temperature range of 45° C. to 115° C. at 10 mm. Hg absolute and having a purity of 95 weight percent as a mixture of decanals and decanols which represents a yield of 65.4 percent by weight based upon the crude hydroformylation product charged to the reactor.

*Example 2*

A sample of nonenes was reacted with carbon monoxide and hydrogen at a pressure of 5800 p.s.i.g. and an inlet space velocity of 1.64 $\text{hour}^{-1}$. A solution of 8.5 weight percent cobalt acetate, dissolved in methanol, and nonenes were fed into a hydroformylation reactor at rates sufficient to give a ratio of cobalt acetate to nonenes of 0.0085 on a weight basis. The ratio of hydrogen to carbon monoxide was 1.20:1 on a molar basis, while the ratio of synthesis gas to olefin was 1.85:1.54 on a molar basis. The hydroformylation was carried out at a temperature of 205° C. The crude product was decobalted and pressure hydrolyzed, as described in Example 1. Upon distillation of the organic layer recovered, there was provided 66.9 percent by weight of a $C_{10}$ aldehyde-alcohol fraction boiling over a temperature range of 45° C. to 115° C. at 10 mm. of Hg absolute and having a purity of 95 weight percent as a mixture of decanols and decanols which represents a yield of 63.6 percent by weight based upon the crude hydroformylation product charged to the reactor.

*Example 3*

A sample of tetrapropylene was reacted with carbon monoxide and hydrogen at a temperature of 205° C. and a pressure of 6000 p.s.i.g. A solution of 8.5 weight percent cobalt acetate, dissolved in methanol, was injected into the reaction zone to give a final concentration of cobalt acetate in the reaction zone of 1.00 percent by weight based on tetrapropylene. The inlet liquid space velocity of tetrapropylene was 1.00 hour$^{-1}$. The crude product was decobalted and hydrolyzed by charging said crude product to a rocker bomb with a ⅙ volume of water and heated to a temperature of 250° C. at autogenous pressure for one-half hour. After the reaction was complete, the crude product was discharged from the bomb and the aqueous and organic layer separated. Upon subsequent distillation of the organic layer, there was obtained 57.7 percent by weight of a $C_{13}$ aldehyde-alcohol fraction boiling over a temperature range of 95° C. to 155° C. at 10 mm. Hg absolute and having a purity of 98 percent which represents a yield of 56.6 percent by weight based upon the crude hydroformylation product.

*Example 4*

In order to illustrate the more rapid reaction rates obtained by the use of a soluble catalyst source, comparative runs were conducted using cobalt acetate dissolved in methanol and cobalt acetate slurried in nonene as the potential catalyst source in the hydroformylation of nonene with hydrogenated carbon monoxide. The time required for the pressure to drop from the initial value of 3000 p.s.i.g. to 2000 p.s.i.g. was used as a measure of the reaction rate. The time required for the pressure to begin to decrease at 3000 p.s.i.g. was used as a measure of the induction period. The induction period is a measure of the time required to generate the catalytically active cobalt carbonyl.

A. Five grams of cobalt acetate slurried in nonene was charged to a rocker bomb. The total nonene charge was 1000 grams. The rocker bomb was pressured cold to 500 p.s.i.g. with equal volume of carbon monoxide and hydrogen, followed by heating to 180° C. at which temperature the pressure rose to 825 p.s.i.g. The pressure was further increased to 3000 p.s.i.g. with equal volumes of carbon monoxide and hydrogen in 25 seconds. The time required for the pressure to begin decreasing was 3 minutes. The time required for the pressure to drop from 3000 to 2000 p.s.i.g. at 198° C. was approximately 10 minutes.

B. Five grams of cobalt acetate dissolved in 54 grams of methanol was charged to the rocker bomb noted in A. The total nonene charge was 1000 grams. The rocker bomb was pressured cold to 500 p.s.i.g. with equal volumes of carbon monoxide and hydrogen, followed by heating to 180° C. at which temperature the pressure rose to only 600 p.s.i.g., indicating that reaction occurred during the heating up process. The pressure was further increased to 3000 p.s.i.g. with equal volumes of carbon monoxide and hydrogen in 25 seconds. The pressure began decreasing before an accurate reading of the pressure meter could be obtained, this indicates that the induction period has essentially been eliminated by the use of a soluble cobalt catalyst source. The time required for the pressure to drop from 3000 p.s.i.g. to 2000 p.s.i.g. at 195° C. was approximately five minutes.

The above data clearly indicates the advantage of dissolving cobalt acetate in methanol as compared with slurring cobalt acetate in nonene as is evidenced by the decreased time to achieve the same results, with the use of the former.

What is claimed is:

1. A process for the production of alcohols from olefins, carbon monoxide, and hydrogen which comprises reacting in a reaction zone an olefin containing from 5 to 15 carbon atoms with carbon monoxide and hydrogen at a temperature in the range of from 100° C. to 250° C. under superatmospheric pressure in the range of from 2000 to 10,000 pounds per square inch absolute in the presence of an oil-insoluble cobalt salt of a lower aliphatic carboxylic acid dissolved in a lower aliphatic alcohol, said cobalt salt being the sole potential catalyst, to produce a crude hydroformylation product comprising aldehydes and alcohols and containing dissolved cobalt-containing compounds, treating said crude hydroformylation product with an aqueous solution of sulfuric acid to form an organic layer comprising aldehydes and alcohols substantially free of dissolved cobalt compounds, and an aqueous layer containing cobalt sulfate, separating said aqueous and organic layers, contacting said organic layer with water at a temperature of from 150° C. to 300° C. and at pressures greater than the vapor pressure of water at the corresponding temperature, separating, by distillation, an aldehyde-alcohol fraction and hydrogenating the aldehyde in said aldehyde-alcohol fraction to alcohols.

2. A process for the production of alcohols from olefins, carbon monoxide, and hydrogen which comprises reacting in a reaction zone an olefin containing from 5 to 15 carbon atoms with carbon monoxide and hydrogen at a temperature in the range of from 100° C. to 250° C. under superatmospheric pressures in the range of from 2000 to 10,000 pounds per square inch absolute in the presence of an oil-insoluble cobalt salt of a lower aliphatic carboxylic acid dissolved in a lower aliphatic alcohol, said cobalt salt being the sole potential catalyst, to produce a crude hydroformylation product comprising aldehydes and alcohols and containing dissolved cobalt-containing compounds, treating said crude hydroformylation product with an aqueous sulfuric acid solution of a concentration of 5 to 10 percent by weight to form an organic layer comprising aldehydes and alcohols and substantially free of dissolved cobalt compounds, and an aqueous layer containing cobalt sulfate, separating said aqueous and organic layers, contacting said organic layer with water at a temperature in the range of from 200° C. to 300° C. under superatmospheric pressures in the range of 250 to 1500 pounds per square inch absolute, separating, by distillation, an aldehyde-alcohol fraction and hydrogenating the aldehyde in said aldehyde-alcohol fraction at a temperature from 50 to 210° C. and at a superatmospheric pressure from 25 to 1200 p.s.i. absolute in the presence of a hydrogenation catalyst.

3. In a hydroformylation process wherein olefinic hydrocarbons containing from 5 to 15 carbon atoms are reacted with carbon monoxide and hydrogen to produce aldehydes and alcohols, the improvement in said process which includes the sequence of steps of reacting in a reaction zone an olefin containing from 5 to 15 carbon atoms with carbon monoxide and hydrogen at a temperature in the range of from 100° C. to 250° C. under superatmospheric pressures in the range of from 2000 to 10,000 pounds per square inch absolute in the presence of an oil-insoluble cobalt salt of a lower aliphatic carboxylic acid dissolved in a lower aliphatic alcohol, said cobalt salt being the sole potential catalyst, to produce a crude hydroformylation product comprising aldehydes and alcohols and containing dissolved cobalt-containing compounds, treating said crude hydroformylation product with an aqueous sulfuric acid solution of a concentration of 5 to 10 percent by weight to form an organic layer comprising aldehydes and alcohols and substantially free of dissolved cobalt compounds, and an aqueous layer containing cobalt sulfate, separating said aqueous and organic layers, contacting said organic layer with water at a temperature in the range of 200° C. to 300° C. at superatmospheric pressures in the range of 250 to 1500 pounds per square inch absolute, separating, by distillation, an aldehyde-alcohol fraction and hydrogenating the aldehyde in said aldehyde-alcohol fraction to alcohols.

4. In a hydroformylation process wherein olefinic hydrocarbons containing 5 to 15 carbon atoms are reacted with carbon monoxide and hydrogen to produce aldehydes and alcohols, the improvement in said process which includes the sequence of steps of reacting in a reaction zone an olefin containing from 5 to 15 carbon atoms with carbon monoxide and hydrogen at a temperature in the range of from 100° C. to 250° C. under superatmospheric pressure in the range of from 2000 to 10,000 pounds per square inch absolute in the presence of cobalt acetate dissolved in methanol, said cobalt acetate being the sole potential catalyst, to produce a crude hydroformylation product comprising aldehydes and alcohols and containing dissolved cobalt-containing compounds, treating said crude hydroformylation product with an aqueous sulfuric acid solution of a concentration of 5 to 10 percent by weight to form an organic layer comprising aldehydes and alcohols and substantially free of dissolved cobalt compounds, and an aqueous layer containing cobalt sulfate, separating said aqueous and organic layers, contacting said organic layer with water at a temperature in the range of 200° to 300° C. at superatmospheric pressure in the range of 250 to 1500 pounds per square inch absolute, separating, by distillation, an aldehyde-alcohol fraction and hydrogenating the aldehyde in said aldehyde-alcohol fraction to alcohols at a temperature of from 50° C. to 210° C. and at a superatmospheric pressure of from 25 to 1200 pounds per square inch absolute in the presence of a hydrogenation catalyst.

5. In a hydroformylation process wherein nonenes are reacted with carbon monoxide and hydrogen to produce aldehydes and alcohols, the improvement in said process which includes the sequence of steps of reacting in a reaction zone nonenes with carbon monoxide and hydrogen at a temperature in the range of from 100° C. to 250° C. under superatmospheric pressures in the range of from 2000 to 10,000 pounds per square inch absolute in the presence of an oil-insoluble cobalt salt of a lower aliphatic carboxylic acid dissolved in a lower aliphatic alcohol, said cobalt salt being the sole potential catalyst, to produce a crude hydroformylation product comprising aldehydes and alcohols and containing dissolved cobalt-containing compounds, treating said crude hydroformylation product with an aqueous solution of sulfuric acid to form an organic layer comprising aldehydes and alcohols and substantially free of dissolved cobalt compounds, and an aqueous layer containing cobalt sulfate, separating said aqueous and organic layers, contacting said organic layer with water at a temperature of from 150° C. to 300° C. at a pressure greater than the vapor pressure of water at the corresponding temperature, separating, by distillation, a decanal-decanol fraction and hydrogenating the decanals in said decanal-decanol fraction to decanols.

6. In a hydroformylation process wherein tetrapropylenes are reacted with carbon monoxide and hydrogen to produce aldehydes and alcohols, the improvement in said process which includes the sequence of steps of reacting in a reaction zone tetrapropylenes with carbon monoxide and hydrogen at a temperature in the range of from 100° C. to 250° C. under superatmospheric pressures in the range of from 2000 to 10,000 pounds per square inch absolute in the presence of an oil-insoluble cobalt salt of a lower aliphatic carboxylic acid dissolved in a lower aliphatic alcohol, said cobalt salt being the sole potential catalyst, to produce a crude hydroformylation product comprising aldehydes and alcohols and containing dissolved cobalt-containing compounds, treating said crude hydroformylation product with an aqueous solution of sulfuric acid to form an organic layer comprising aldehydes and alcohols and substantially free of dissolved cobalt compounds, and an aqueous layer containing cobalt sulfate, separating said aqueous and organic layers, contacting said organic layer with water at a temperature of from 150° C. to 300° C. at a pressure greater than the vapor pressure of water at the corresponding temperature, separating, by distillation, a tridecanol-tridecanol fraction and hydrogenating the tridecanals in said tridecanal-tridecanol fraction to tridecanols.

7. In a hydroformylation process wherein heptenes are reacted with carbon monoxide and hydrogen to produce aldehydes and alcohols, the improvement in said process which includes the sequence of steps of reacting in a reaction zone heptenes with carbon monoxide and hydrogen at a temperature in the range of from 100° C. to 250° C. under superatmospheric pressures in the range of from 2000 to 10,000 pounds per square inch absolute in the presence of an oil-insoluble cobalt salt of a lower aliphatic carboxylic acid dissolved in a lower aliphatic alcohol, said cobalt salt being the sole potential catalyst, to produce a crude hydroformylation product comprising aldehydes and alcohols and containing dissolved cobalt-containing compounds, treating said crude hydroformylation product with an aqueous solution of sulfuric acid to form an organic layer comprising aldehydes and alcohols and substantially free of dissolved cobalt compounds, and an aqueous layer containing cobalt sulfate, separating said aqueous and organic layers, contacting said organic layer with water at a temperature of from 150° C. to 300° C. at a pressure greater than the vapor pressure of water at the corresponding temperature, separating, by distillation, an octanal-octanol fraction and hydrogenating the octanals in said octanal-octanol fraction to octanols.

8. In a hydroformylation process wherein pentenes are reacted with carbon monoxide and hydrogen to produce aldehydes and alcohols, the improvement in said process which includes the sequence of steps of reacting in a reaction zone pentenes with carbon monoxide and hydrogen at a temperature in the range of from 100° C. to 250° C. under superatmospheric pressures in the range of from 2000 to 10,000 pounds per square inch absolute in the presence of an oil-insoluble cobalt salt of a lower aliphatic carboxylic acid dissolved in a lower aliphatic alcohol, said cobalt salt being the sole potential catalyst, to produce a crude hydroformylation product comprising aldehydes and alcohols and containing dissolved cobalt-containing compounds, treating said crude hydroformylation product with an aqueous solution of sulfuric acid to form an organic layer comprising aldehydes and alcohols and substantially free of dissolved cobalt compounds, and an aqueous layer containing cobalt sulfate, separating said aqueous and organic layers, contacting said organic layer with water at a temperature of from 150° C. to 300° C. at a pressure greater than the vapor pressure of water at the corresponding temperature, separating, by distillation, a hexanal-hexanol fraction and hydrogenating the hexanals in said hexanal-hexanol fraction to hexanols.

9. In a hydroformylation process wherein octenes are reacted with carbon monoxide and hydrogen to produce aldehydes and alcohols, the improvement in said process which includes the sequence of steps of reacting in a reaction zone octenes with carbon monoxide and hydrogen at a temperature in the range of from 100° C. to 250° C. under superatmospheric pressures in the range of from 2000 to 10,000 pounds per square inch absolute in the presence of an oil-insoluble cobalt salt of a lower aliphatic carboxylic acid dissolved in a lower aliphatic alcohol, said cobalt salt being the sole potential catalyst, to produce a crude hydroformylation product comprising aldehydes and alcohols and containing dissolved cobalt-containing compounds, treating said crude hydroformylation product with an aqueous solution of sulfuric acid to form an organic layer comprising aldehydes and alcohols substantially free of dissolved cobalt compounds, and an aqueous layer containing cobalt sulfate, separating said aqueous and organic layers, contacting said organic layer with water at a temperature of from 150° C. to 300° C. at a pressure greater than the vapor pressure of water at the corresponding temperature, separating, by distillation, a nonanal-nonanol fraction and hydrogenating the nonanals in said nonanal-nonanol fraction to nonanols.

10. In a hydroformylation process wherein pentapropylenes are reacted with carbon monoxide and hydrogen to produce aldehydes and alcohols, the improvement in said process which includes the sequence of steps of reacting in a reaction zone pentapropylenes with carbon monoxide and hydrogen at a temperature in the range of from 100° C. to 250° C. under superatmospheric pressures in the range of from 2000 to 10,000 pounds per square inch absolute in the presence of an oil-insoluble cobalt salt of a lower aliphatic carboxylic acid dissolved in a lower aliphatic alcohol, said cobalt salt being the sole potential catalyst, to produce a crude hydroformylation product comprising aldehydes and alcohols and containing dissolved cobalt-containing compounds, treating said crude hydroformylation product with an aqueous solution of sulfuric acid to form an organic layer comprising aldehydes and alcohols and substantially free of dissolved cobalt compounds, and an aqueous layer containing cobalt sulfate, separating said aqueous and organic layers, contacting said organic layer with water at a temperature of from 150° C. to 300° C. at a pressure greater than the vapor pressure of water at the corresponding temperature, separating, by distillation, a hexadecanal-hexadecanol fraction and hydrogenating the hexadecanals in said hexadecanal-hexadecanol fraction to hexadecanols.

References Cited in the file of this patent

UNITED STATES PATENTS

| | | |
|---|---|---|
| 2,638,487 | Russum et al. | May 12, 1953 |
| 2,691,046 | Hasek | Oct. 5, 1954 |
| 2,748,167 | Hagemeyer et al. | May 29, 1956 |
| 2,750,430 | Hagemann et al. | June 12, 1956 |
| 2,757,203 | Hale | July 31, 1956 |
| 2,802,843 | Tramm et al. | Aug. 13, 1957 |
| 2,809,220 | Mertzweiller et al. | Oct. 8, 1957 |
| 2,810,680 | Buchner et al. | Oct. 22, 1957 |

FOREIGN PATENTS

| | | |
|---|---|---|
| 156,932 | Australia | June 7, 1954 |
| 679,664 | Great Britain | Sept. 24, 1952 |
| 736,875 | Great Britain | Sept. 14, 1955 |
| 523,707 | Canada | Apr. 10, 1956 |